June 21, 1966  R. W. STOTT  3,257,033
BEER DISPENSING APPARATUS
Filed June 22, 1964  10 Sheets-Sheet 1

Inventor
Reginald W. Stott
By Stevens, Davis, Miller & Mosher
Attorneys

Inventor
Reginald W. Stott
By Stevens Davis Miller & Mosher
Attorneys

June 21, 1966 R. W. STOTT 3,257,033
BEER DISPENSING APPARATUS
Filed June 22, 1964 10 Sheets-Sheet 6

Inventor
Reginald W. Stott
By Stevens, Davis, Miller & Mosher
Attorneys

June 21, 1966  R. W. STOTT  3,257,033
BEER DISPENSING APPARATUS
Filed June 22, 1964  10 Sheets-Sheet 7

Inventor
Reginald W. Stott
By Stevens Davis, Miller & Mosher
Attorneys

June 21, 1966  R. W. STOTT  3,257,033
BEER DISPENSING APPARATUS
Filed June 22, 1964  10 Sheets-Sheet 8

Inventor
Reginald W. Stott
By Stevens, Davis, Miller & Mosher
Attorneys

Inventor
Reginald W. Stott
By Stevens Davis Miller & Mosher
Attorneys

United States Patent Office 3,257,033
Patented June 21, 1966

1

3,257,033
BEER DISPENSING APPARATUS
Reginald W. Stott, 4021 Farrington St., South Burnaby,
British Columbia, Canada
Filed June 22, 1964, Ser. No. 376,840
Claims priority, application Canada, Sept. 16, 1963,
884,598
19 Claims. (Cl. 222—36)

This invention relates to a combined apparatus for the semi-automatic dispensing of a predetermined quantity of liquid and to the simultaneous counting of the number of such predetermined quantities of liquid which have been dispersed. A subsidiary aspect of this invention is a valve control means for use in that apparatus, and particularly a switch arrangement associated with said valve. The apparatus is particularly suited for the dispensing of efferverscent liquids, and more particularly for the dispensing of beer.

It is necessary, in the dispensing of effervescent or gas-charged liquids such as, for example, beer, to dispense such liquid, even by relatively inexperienced help, in such a manner that uniform results are obtained. It is also necessary that such dispensing means be capable of being set quickly and easily for the drawing of varying amounts of such liquids, i.e., for the drawing of two, or more, different sizes of drafts. Furthermore, it is desirable to have means associated with such dispensing means to count the total number of each size of drafts which have been drawn.

It was proposed accomplishing these ends by the use of an auxiliary storage tank where the required amount of beer was stored prior to dispensing. This proved undesirable, since this auxiliary storage, and the means used to dispense the beer therefrom, tended to have a deterimental effect on the delicate quality of the beer.

A prime feature, therefore, of the present invention, is the provision of apparatus whereby beer and similar liquids may be dispensed by relatively inexperienced help, in such a manner that uniform results are obtained.

A further feature is the provision of means whereby the apparatus may be quickly and easily set for the automatic dispensing of two or more different quantities, i.e., two or more different sizes of drafts.

A still further feature of this invention is the provision of counter means for the cumulative totalling of the number of each size of drafts which have been dispensed.

Another feature of the present invention is the provision of a novel switch arrangement.

Another feature of this invention is the provision of automatic dispensing means which is operated on a pour-pause-pour sequence with the time of pour and the time of pause controllable within certain limits.

By one broad aspect of this invention, then, there is provided, in apparatus including a valve for dispensing liquid through an outlet, valve controlling means comprising: a handle; a double acting cylinder including a piston therein, a shaft, inlet means to each side of said piston and outlet means from each side of said piston; means associated with said handle to initiate movement of said piston; and, linkage operatively associated with said shaft to open and to close said valve to permit the the controlled dispensing of said liquid.

By a specific embodiment of this aspect, there is provided, in apparatus including a valve for dispensing liquids through an outlet, valve controlling means comprising: a handle; a double acting cylinder including a pair of pistons interconnected by a rack, a pinion enmeshed on said rack, a shaft operatively connected to said pinion, and inlet and outlet means for fluid for each of said pistons; means associated with said handle to initiate move-

2 ment of said pistons; and, linkage operatively associated with said shaft to open and to close said valve to permit the controlled dispensing of said liquid.

By another aspect of this invention there is provided apparatus for the dispensing of a predetermined amount of liquid comprising: a main valve communicating an outlet with a source of said liquid under pressure; an operating handle; switching means actuated by movement of said handle; movable timing means initiated by actuation of said switching means; valve means in a first air line operatively connected to said timing means and opened by the initiation of movement of said timing means; a cylinder including a first piston and a linkage operatively associated therewith, said piston being operated by air in said first air line to cause said linkage to open said main valve to permit the flow of said liquid through said outlet; valve means in a second air line operatively associated with said timing means and opened by the cessation of movement of said timing means; and a second piston in said cylinder, said piston being operatively associated with said linkage and being operated by air in said second air line to cause said linkage to close said main valve to stop the flow of liquid through said outlet, the amount of liquid discharged through said outlet being thereby determined and controlled by the time of movement in said timing means. Preferably, an electrically actuated counter is associated with the aforesaid apparatus, actuated by the switching means, to total the number of drafts dispensed.

By another aspect of this invention there is provided means for controlled dispensing of draft beer subject to foam producing characteristics as it is dispensed, comprising: a faucet having an axial bore therethrough; a discharge spout at its lower end; a beer supply passage communicating with said bore; a valve seat in said bore; a cylinder having a piston therein and a piston rod projecting from one end thereof, said end of said cylinder forming a closure for the opposite end of said bore; a valve element on the end of said piston rod engageable with said valve seat; means urging said rod towards said valve seat to interrupt communication between said spout and said bore; means communicating with said cylinder for moving said piston whereby to disengage said valve element from said seat; a switch on said faucet; a circuit connected with said switch; means in said circuit controlling supply to said cylinder; and control means in said circuit initiated by momentary contact of said switch for maintaining said valve open over a time period required for filling said glass to a predetermined level whereby the user may retract the glass from said faucet to desired extent during said time period as to increase or decrease the amount of foam produced when said glass is filled.

By yet another aspect of this invention there is provided a switch arrangement comprising: a valve; pivotally mounted means movable between a first position wherein said valve is open and a second position wherein said valve is closed; first linkage means secured at one end to said pivotally mounted means; a terminal end of a piston rod of a double acting fluid cylinder attached to the other end of said linkage means; lever means movable between a first position and a second position; and second linkage means connected to said lever means for initiating the flow of fluid to operate said cylinder whereby to open said valve. According to an embodiment of this aspect of the invention, there is provided a switch arrangement comprising: a valve; pivotally mounted means movable between a first position wherein said valve is open and a second position wherein said valve is closed; first linkage means secured at one end to said pivotally mounted means; a double acting air cylinder including a piston and air inlet means on either side of said piston; a piston rod attached to said piston and slidable therewith, said piston rod being provided with a plurality of teeth for acting as a rack; a pinion engaging said rack; a rod connected to said pinion and adapted to be rotated in complementary relation to movement of said pinion; a cam secured to the free end of said rod; a bifurcated arm pivotally secured to the end of said cam, said bifurcated arm being secured at its other end to the other end of said first linkage means; pivotally mounted lever means movable between a first position and a second position; second linkage means connected to said lever means for initiating the flow of air to one side of said piston to operate said cylinder whereby to open said valve and for initiating flow of air to the other side of said piston whereby to close said valve; and a cap over said valve, said lever means and said second linkage means, while by another embodiment of this aspect there is provided a switch arrangement comprising: a valve; pivotally mounted means movable between a first position wherein said valve is open and a second position wherein said valve is closed; first linkage means secured at one end to said pivotally mounted means; a double acting air cylinder including a piston and air inlet means to either side of said piston; a piston rod connected to said piston and projecting out one end of said cylinder; a coil spring secured at one end to said piston rod and at the other end to said first linkage means whereby resiliently to connect said piston rod to said first linkage means; pivotally mounted lever means movable between a first position and a second position; second linkage means connected to said lever means, for initiating the flow of air to one side of said piston to operate said cylinder whereby to open said valve, and for initiating flow of air to the other side of said piston whereby to close said valve; and a cap over said valve, said lever means and said second linkage means.

By yet another aspect of this invention there is provided means for controlled dispensing of a liquid comprising: a faucet including a discharge means, a valve operable between an opened and a closed position and a lever for operating said valve; a lquid supply conduit to a faucet; a double acting fluid cylinder including a piston and a piston rod projecting from one end thereof; linkage means connecting said lever and said piston rod; a second lever movable between a first position and a second position; a microswitch; a second linkage means connecting said second lever to said microswitch at least one timing circuit associated with said microswitch; means associated with said timing circrcuit for controlling supply of said fluid to said cylinder, said means being actuated by commencing of the time cycle of said timing circuit to initiate fluid flow to said cylinder to move said piston rod in a first direction and actuated by the cessation of the timed cycle of said timing circuit for initiating fluid flow to said cylinder to move said piston rod in a second direction, whereby, movement of said piston rod in said first direction opens said valve and movement in said second direction closes said valve. By one embodiment of this aspect there is provided means for controlled dispensing of draft beer subject to foam producing characteristics comprising: a faucet including a discharge means, a valve operable between an opened and a closed position and a lever for operating said valve; a liquid supply conduit to a faucet; a double acting air cylinder including a piston and a piston rod projecting from one end thereof; linkage means connecting said lever and said piston rod; a second lever movable between a first position and a second position, a microswitch actuated by the presence of said second lever in said second position; a second linkage means connecting said second lever to said microswitch; at least two timing circuits associated with said microswitch; one said circuit having a timed cycle adjustable between a first increment of a first selected time and a second increment of said first selected time; another said circuit having a timed cycle adjustable between a first increment of a second selected time and a second increment of said second selected time, said second selected time being substantially longer than said first selected time manually actuatable means for selecting one of said timing circuits to be operably connected to said microswitch means associated with said selected timing circuit for controlling supply of said air to said cylinder, said means being actuated by commencing of the timed cycle of said timing circuit to initiate air flow to said cylinder to move said piston rod in a first direction and actuated by the cessation of the timed cycle of said timing circuit for initiating air flow to said cylinder to move said piston rod in a second direction, whereby, movement of said piston rod in said first direction opens said valve and movement in said second direction closes said valve, while by another embodiment of this aspect there is provided means for controlled dispensing of draft beer subject to foam producing characteristics comprising: a faucet including a discharge means, a valve operable between an opened and a closed position and a lever for operating said valve; a liquid supply conduit to a faucet; a double acting air cylinder including a piston and a piston rod projecting from one end thereof; linkage means connecting said lever and said piston rod; a second lever movable between a first position and a second position; a microswitch actuated by the presence of said second lever in said second position; a second linkage means connecting said second lever to said microswitch, three timing circuits associated with said microswitch; one said current having a timed cycle adjustable between a first increment of a first selected time and a second increment of said first selected time; another said circuit having a timed cycle adjustable between a first increment of a second selected time and a second increment of said second selected time, said second selected time being substantially longer than said first selected time manually actuatable means for selecting one of said timing circuits to be operably connected to said microswitch, said third timing circuit having a timed cycle adjustable between a third selected time and a fourth selected time for controlling the time interval between the cessation of the timed cycle of the selected timing circuit and the beginning of the next timed cycle of the selected timing circuit, said third timing circuit being actuated by continued presence of said second lever in said second position; means associated with said timing circuit for controlling supply of said air to said cylinder, said means being actuated by commencing of the timed cycle of said timing circuit to initiate air flow to said cylinder to move said piston rod in a first direction and actuated by the cessation of the timed cycle of said timing circuit for initiating air flow to said cylinder to move said piston rod in a second direction, whereby, movement of said piston rod in said first direction opens said valve and movement in said second direction closes said valve.

*Structure of FIGURES 1–5*

Figure 1:
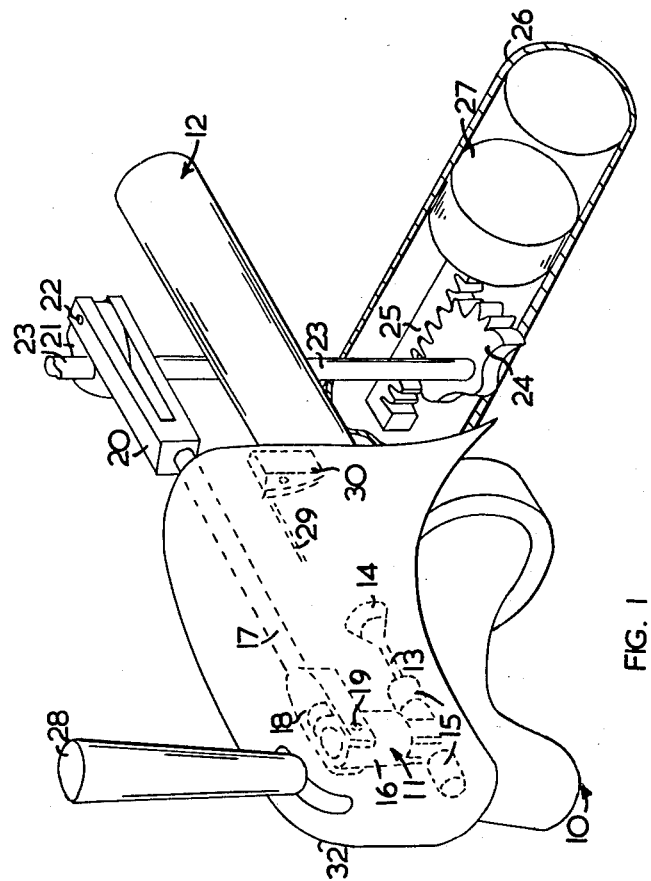
FIGURE 1 is a perspective view, partly broken away, of the valve controlling means according to one embodiment of the invention.

Turning first to FIGURE 1, there is shown a conventional beer spout 10 connected through a valve 11 in a beer supply line 12 to a source of beer under pressure. The valve 11 is a conventional beer valve, such as the type manufactured and sold by the Perlick Company of Milwuakee, Wisconsin, U.S.A. It is noted however, that this valve includes a slidable valve stem 13 integral with a valve head 14 which, when in one position, permits beer to flow from line 12 out through spout 10. Valve stem 13 slides within bearings 15. The sliding movement is derived from movement of the lever 16.

The lever is actuated to move the valve head 14 to the "open" or to the "close" position by means of link rod 17 which is bifurcated at one end 18, the legs of the fork passing on either side of lever 16 and being connected thereto by pin 19. Link rod 17 is, in turn connected to bifurcated connecting arm 20. A cam 21 is rotatably affixed to the arm 20 between its two sections by means of pin 22. A shaft 23 is keyed to the cam 21 at one end, and is keyed to a pinion 24 at the other end thereof. The pinion 24 is associated with a rack 25, and both are disposed within a double acting air cylinder 26. The rack 25 comprises the piston shaft, while the piston head is shown as 27.

Also provided in this valve control mechanism is a hand operated tap handle 28 linked by linkage rod 29 to a microswitch 30. As shown more clearly in FIGURE 1, a microswitch 30 is provided with a hand operated toggle selector switch 31, since microswitch 30 is of a type which can actuate two separate and independent circuits when it is operated to its close position by the tap handle 28.

The tap handle linkage, the microswitch, the valve linkage, and the valve are all encased by a hood 32. The cooperations of the individual components shown in FIGURE 1 will be explained hereinafter when discussing the operation of the present invention.

Figure 2:
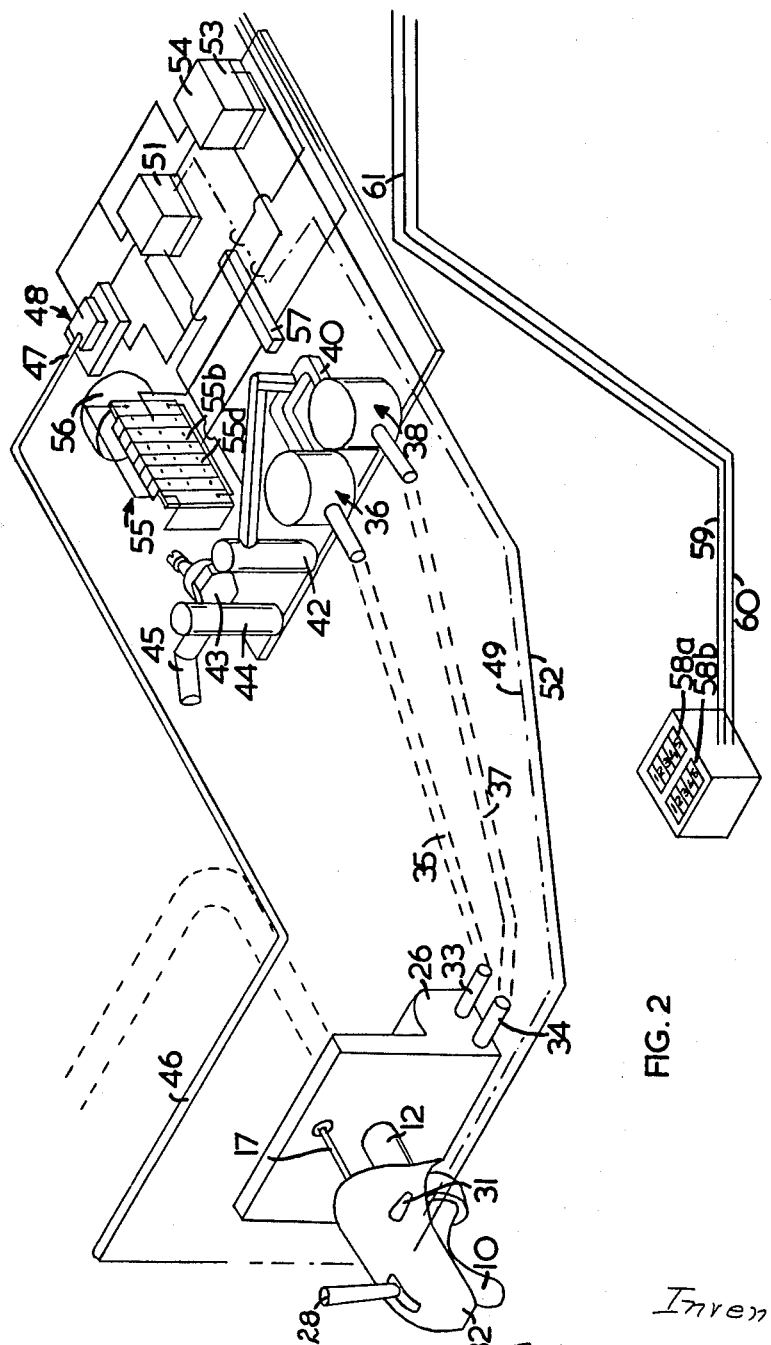
FIGURE 2 is a simplified and partly schematic perspective view of an apparatus according to one embodiment of this invention.

The simplified interconnection of the elements constituting one feature of the present invention, is shown in FIGURE 2. The double acting air cylinder is provided with an inlet 33 located at one of the cylinder 26 leading to one side of the piston 27 and an inlet 34 located at the other end of the cylinder 26 leading to the other side of the piston 27. Inlet 33 is connected via flexible line 35 to a solenoid actuated air valve 36. Inlet 34 is connected via flexible line 37 to another solenoid actuated air valve 38. Three-way valves 36 and 38 are those manufactured by Valvair Corporation, and are known as "Valvair Solenoids," model No. LC–23–A. However, other solenoid actuated air valves may be used.

Air under pressure which is permitted to flow through line 35 by valve 36 and to flow through line 37 by valve 38 is admitted through line 45 connected to a source of air under pressure (not shown). It then passes through an air filter 44, which may be that known in the trade as the Norgren Denver Model No. 12–003–002. Filter air then passes through a pressure regulator 43, which may be that available in the trade as the Norgren Model No. CD–D3. Air, now under the desired pressure passed to a lubricator 42 where it picks up a fine mist of lubricating oil, which is used to lubricate the valves 36 and 38 and the cylinder 26. Such lubricator may be that available in the trade as the Norgren "Micro-Fog" Model No. 10–004–008. Air containing entrained oil then passes along main air line 41 which branches into two auxiliary lines, namely 40 leading to valve 38 and 39 leading to valve 36.

The Norgren "Micro-Fog" is based on the invention of one or more of the following United States Patents:

2,538,031 issued Jan. 16, 1951 to C. A. Norgren;
2,564,309 issued Aug. 14, 1951 to C. A. Norgren;
2,442,777 issued June 8, 1948 to C. A. Norgren;
2,682,393 issued June 29, 1954 to C. A. Norgren;
2,747,668 issued May 29, 1956 to R. L. Keefe, Jr.;
2,890,765 issued June 16, 1959 to M. V. Friedell;
2,912,064 issued Nov. 10, 1959 to M. V. Friedell, and
2,966,312 issued Dec. 27, 1960 to J. A. Wilson, Jr. and M. V. Friedell.

One terminal (not shown) of the microswitch is connected via line 46 to one terminal 47 of a 12 volt transformer 48. The associated other terminal (not shown) of the microswitch 30 is connected via line 49 to one terminal 50 on an "on-off" relay 51. A third terminal (also not shown) of microswitch 30 is connected, via line 52 to one terminal 53 of a selector relay 54.

The interconnections between transformer 48, relay 51, selector relay 54, timer microswitches 55, timer motor 56 and terminal bank 57, will be described in detail with reference to FIGURES 3, 4 and 5. However, it is to be noted that electrically actuated counters 58a and 58b are connected to timer microswitch 55. Thus, counter 58a is connected, at one of its terminals by wire 59 to timer microswitch 55b. Counter 58b is connected at one of its terminals by wire 60 to timer microswitch 55d. Wire 61 leads from the common terminal between 58a and 58b to a sourve of 110 v. supply.

Figure 3:
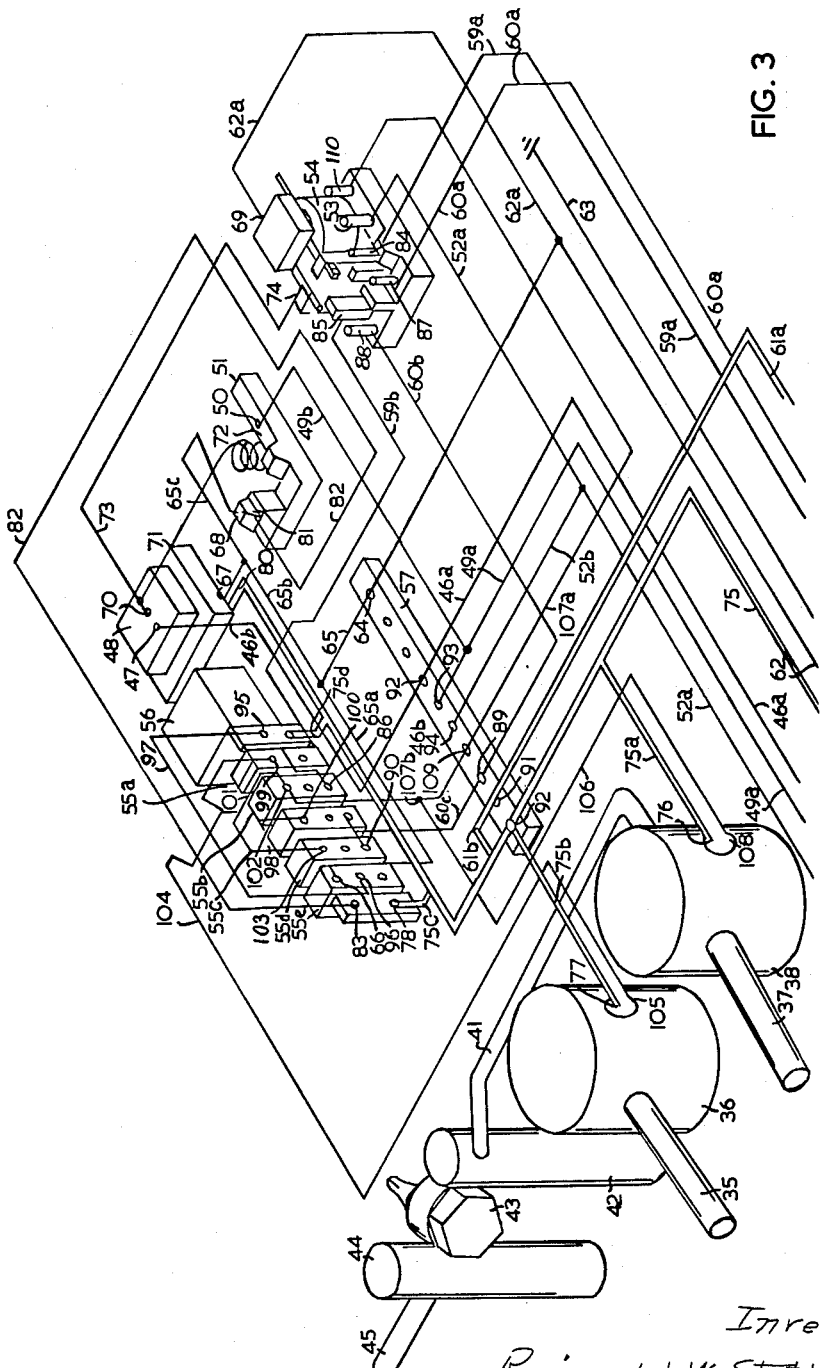
FIGURE 3 is a simplified and partly schematic perspective view of the timing apparatus used in one embodiment of this invention.
Figure 4:
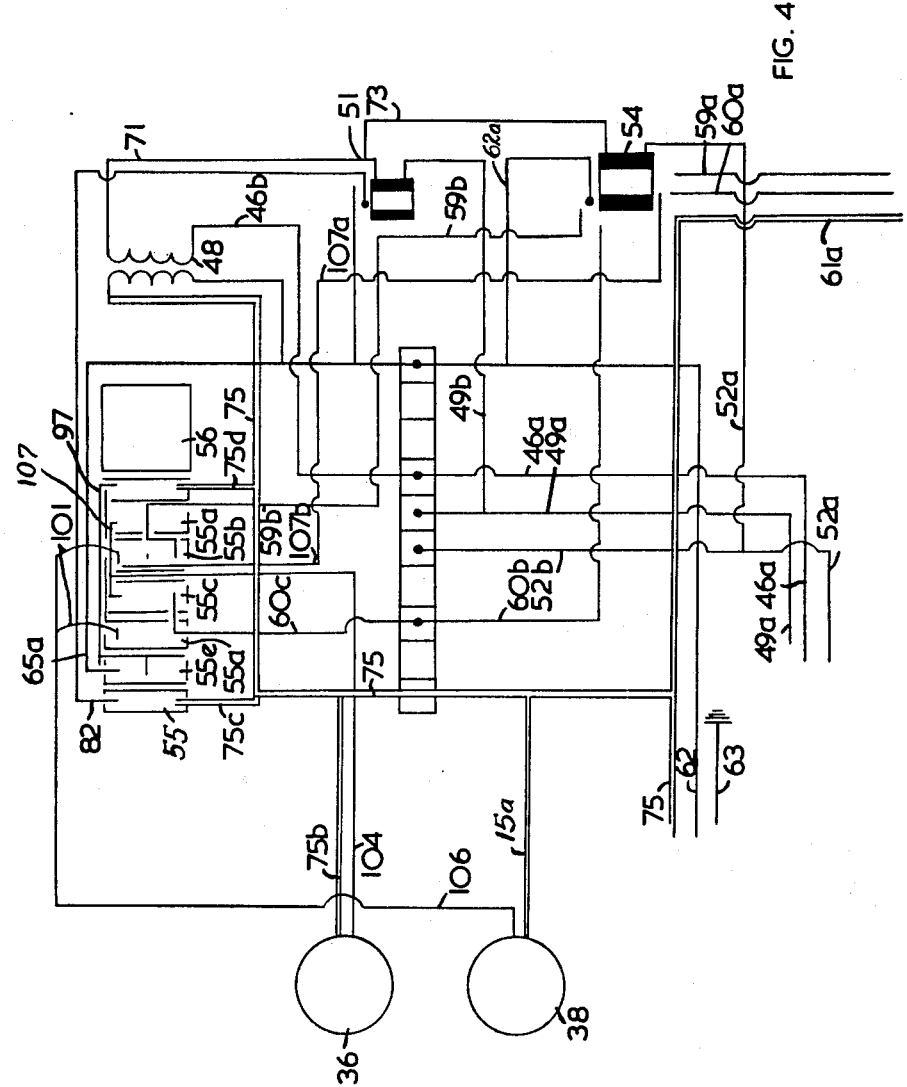
FIGURE 4 is a simplified and partly diagrammatic top plan view of the timing apparatus used in one embodiment of the present invention.
Figure 5:
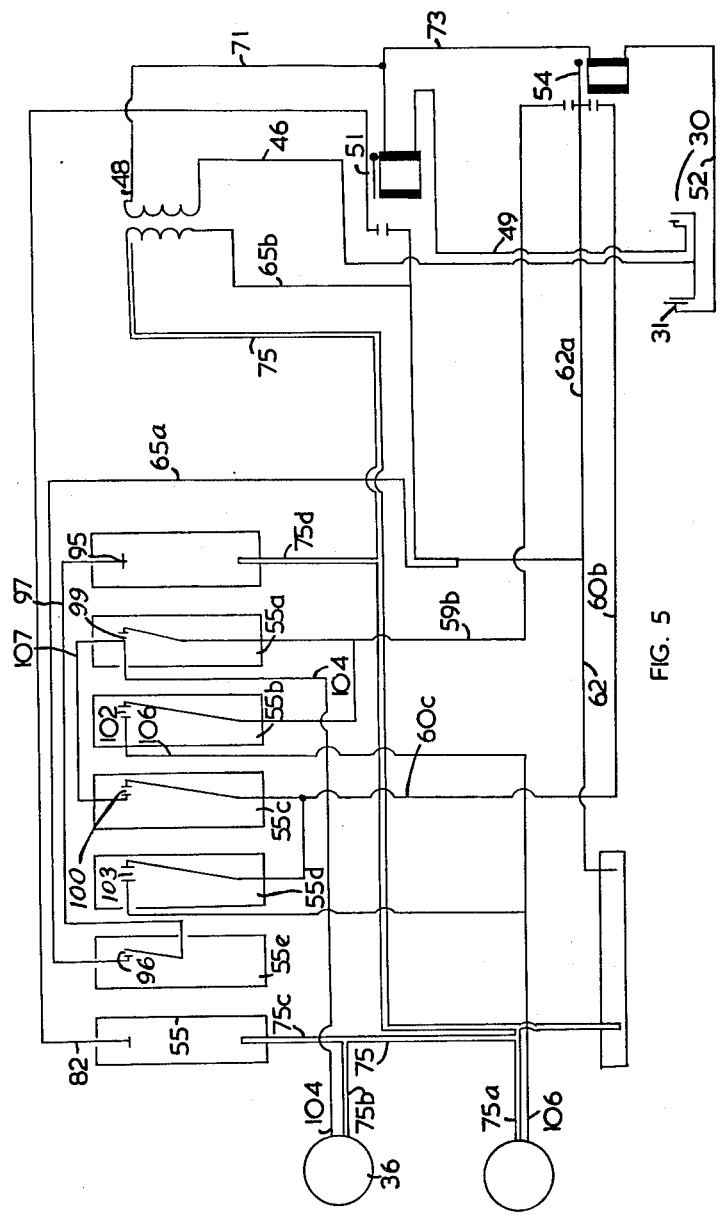
FIGURE 5 is a simplified and partly diagrammatic top plan view of a portion of the timing apparatus used in one embodiment of the present invention.

The electrical interconnection between various elements is shown in FIGURES 3, 4 and 5. As was seen in FIGURE 2, however, one terminal of microswitch 30 was connected at terminal 47 to transformer 48 by line 46. Another terminal of microswitch 30 was connected at terminal 50 of "on-off" relay 51 by line 49. The third terminal of microswitch 30 was connected at terminal 53 of selector relay 54 by line 52. Line 46 of FIGURE 2 is shown in FIGURES 3, 4 and 5 as line 46a leading to terminal 92 on terminal block 57. From terminal 92, wire 46b leads to terminal 47 on transformer 48. Line 49 of FIGURE 2 is shown in FIGURES 3, 4 and 5 as line 49a leading to terminal 93 on terminal block 57. Line 49a branches off as line 49b to join terminal 50 of "on-off" relay 51. Line 52 of FIGURE 2 is shown, in FIGURES 3, 4 and 5 as line 52a leading to terminal 53 of relay 54, and a branch line 52b leading to terminal 94 of terminal bank 57.

Power for the operation of the apparatus is provided by 110 v. line 62 and its companion grounded line 63. Line 62 extends to terminal 64 of terminal bank 57. From it a line 65 extends, and it branches to line 65a connected to input terminal 66 of timer microswitch 55e. Another branch 65b extends to terminal 67 of the input winding of transformer 48. A third branch 65c connects to terminal 68 of on-off relay 51. Line 62 itself branches off on line 62' which is connected to input terminal 69 of selector relay 54. The second 110 v. input power line 75 leads to terminal 92 on terminal block 57 and continues past such terminal. It also branches to: line 75a which is connected to terminal 76 of solenoid 38; line 75b which is connected to terminal 77 of solenoid 36; line 75c which is connected to the input terminal 78 of timer microswitch 55; line 75d which is connected to the input terminal of timer motor 56; and extends to the second input terminal 80 of transformer 48.

The transformer 48 supplies proper power to the on-off relay 51 and to the selector relay 54 by a connection between an output terminal 70 of transformer 48 by wire 71 to terminal 72 of on-off relay 51, and by wire 73 from output terminal 70 to transformer 48 to terminal 74 of selector relay 54.

On-off relay 51 is connected to the timer microswitches 55 from terminal 81 and wire 82 to terminal 83.

As seen in FIGURE 2, counter 58a was connected by line 59 to timer microswitch 55b. As seen in FIGURE 3, line 59 is constituted by line 59a leading to terminal 84 of selector relay 54 and by line 59b leading from terminal 85 of relay 54 to terminal 86 of timer microswitch 55b.

As also seen in FIGURE 2, counter 58b was connected by line 60 to timer microswitch 55d. As seen in FIGURE 3, line 60 is constituted by line 60a leading to terminal 87 of relay 54, line 60b leading from terminal 88 of relay 54 to terminal 89 on terminal bank 57 and by line 60c leading from terminal 89 on terminal bank 57 to terminal 90 of timer microswitch 55d.

The 110 v. line 61 shown in FIGURE 2 is also shown in FIGURE 3 is line 61a leading to terminal 91 on terminal bank 57, and 61b from terminal 91 to join line 75.

Timer motor 56 is connected from terminal 95 to timer microswitch 55e at terminal 96 by means of jumper 97. Timer microswitch 55a is connected to timer microswitch 55c by a jumper 107 from terminal 99 on microswitch 55a to terminal 100 on microswitch 55c. Timer microswitch 55b is connected to timer microswitch 55b by jumper 101 between terminal 102 on microswitch 55b and terminal 103 on microswitch 55d.

Microswitches 55a and 55c are each connected to solenoid 36 by means of lead 104 joined at one end to jumper 107 and at the other end to terminal 105 on solenoid 36. Similarly, microswitches 55b and 55d are each connected to solenoid 38 by means of line 106 which is joined to line 107b at one end thereof and to terminal 108 on solenoid 38. Line 107b connects terminal 109 on microswitch 55b to terminal 109 on terminal bank 57. In turn line 107a joins terminal 109 to terminal 110 on relay 54.

The timer microswitches 55 and timer motor 56 may be those which are available in the trade from Sperry Gyroscope and are known as the Bodine, Model No. KVC23RB. The transformer 48 may be that which is available in the trade as Magnetic Coil Model No. G1208A of the Magnetic Coil Co., Kitchener, Ontario, Canada. The on-off relay 51 may be that known in the trade as the BIXBX available from the Renfrew Electric Company. The selector 54 may also be that known in the trade as the BIXBX available from the Renfrew Electric Company. The electrically actuated counter 58 may be that known in the trade as the 5G135 and available from General Controls Co.

*Operation of embodiment of FIGURES 1–5*

In operation, reference should be made to FIGURE 2. First, the toggle selector switch is placed in one of two positions representative of a "large" draft, or a "small" draft. The large draft representation is coupled to timer microswitches 55a and 55c while the small draft representation is coupled to the timer microswitches 55b and 55d. For the sake of this description, a large draft will be dispensed, but it will be appreciated that a similar operation follows for dispensing a small draft.

Downward rotation of the tap handle 28 moves linkage rod 29 which actuates microswitch 30. This, in turn, completes the circuit to the on-off relay 51. When the circuit in the on-off relay 51 is completed, the flow of current results in completion of the circuit to start the timer motor 56. The starter motor turns cams (not shown) which rotate on a shaft. These cams make and break the circuit in the timer microswitches 55. When the timer motor starts, the cam associated with microswitch 55a actuates microswitch 55a which completes the circuits to solenoid valve 36. This permits air from line 45 to pass through line 35 to inlet 33 of air cylinder 26. This air forces the piston head 27 along cylinder 26 and moves rack 25. This causes pinion 24 to be rotated in a clockwise direction, which in turn rotates shaft 23 and cam 21 in a clockwise direction. Such motion pulls arm 20 and link 17 which in turn pivots lever 16 to cause valve head 14 to open. This permits beer under pressure in supply line 12 to emerge through beer spout 10.

When the cam (not shown) associated with timer microswitch 55c has rotated for a preselected time, adjusted to permit a specified volume of beer under its added pressure to flow through beer spout 10, the cam actuates microswitch 55c. Simultaneously, the cam (not shown) associated with microswitch 55a, causes that microswitch to be open again, stopping the aforedescribed chain of events. However, the valve head 14 is positively closed in the following manner: when microswitch 55c is actuated, the circuit to solenoid-valve 38 is completed. This permits air from line 45 to pass through line 37 to inlet 34 of air cylinder 26. This air forces the piston head 27 to its original position and moves rack 25. This causes pinion 24 to rotate in a counter clockwise direction, which, in turn, rotates shaft 23 and cam 21 in a counter clockwise direction. Such motion pushes arm 20 and link rod 17 which is turn pivots lever 16 to cause valve head 14 to close the valve port (not shown). This, of course, stops the flow of beer from beer supply line 12 out through beer spount 10.

It is to be noted that the beer tap handle 28 need only be moved downwardly to actuate micro-switch 30 and then be returned to its original position. The handle is preferably spring loaded to remain in either the open or the closed position. The spring action would then hold the tap in the open position for continuous operation. The entire dispensing sequence to dispense a uniform preselected quantity of beer is then automatic. Also, when microswitch 55a is actuated, the circuit to counter 58a is completed, and a tally is made.

*Structure of FIGURES 6–10*

Figure 6:
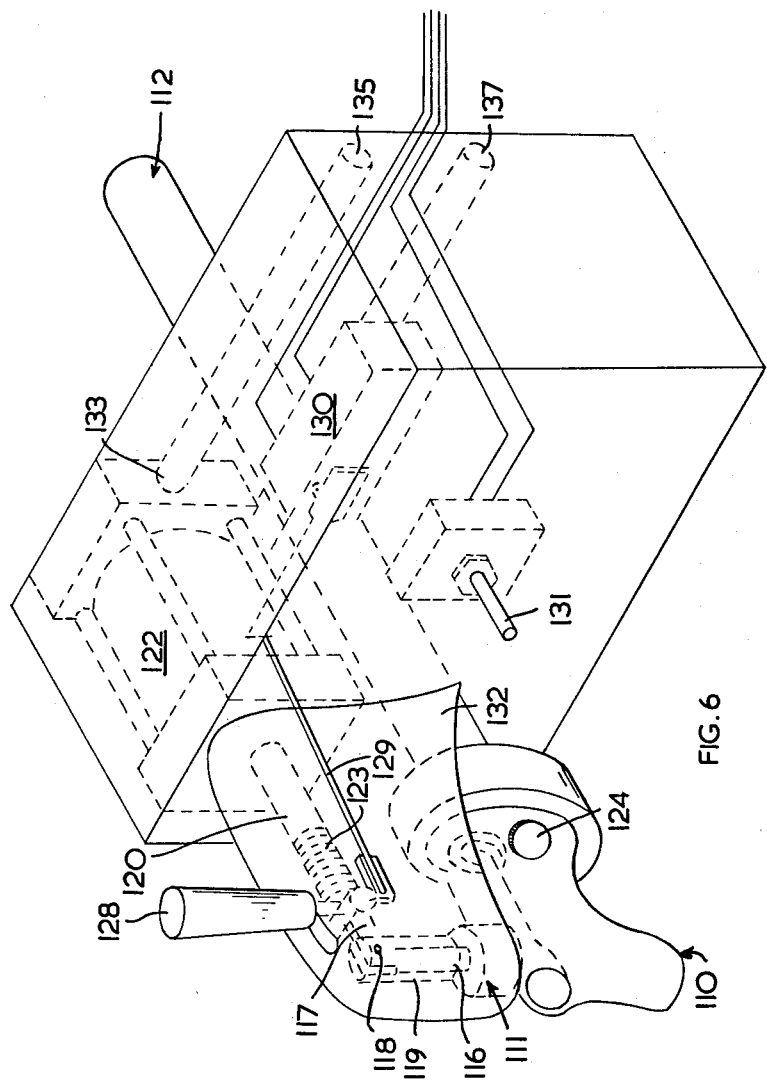
FIGURE 6 is a perspective view, partly in phantom and partly diagrammatic, of the valve controlling means according to another embodiment of this invention.
Figure 7:
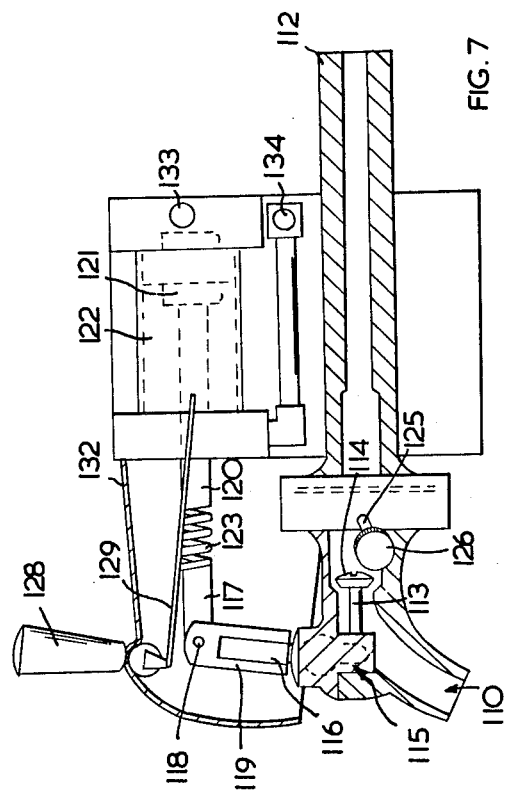
FIGURE 7 is a central longitudinal vertical section of the valve and switching means of the embodiment of FIGURE 6.

Turning first to FIGURES 6 and 7, there is shown a conventional beer spout 110 connected through a valve 111 in a beer supply line 112 to a source of beer under pressure. The valve 111 is a conventional beer valve, such as the type manufactured and sold by the Perlick Company of Milwaukee, Wisconsin, U.S.A. It is noted that this valve includes a slidable valve stem 113 integral with a valve head 114 which, when in one position, permits beer to flow from line 112 out through spout 110. Valve stem 113 slides within bearings 115. The sliding movement is derived from movement of the lever 116.

The lever is actuated to move the valve head 114 to the open or to the close position by means of link rod 117 which is pivotally secured at one end by pin 118, to a cap 119 which telescopes over lever 116. Link rod 117 is, in turn resiliently connected to the piston rod 120 of a piston 121 within a double acting air cylinder 122 by means of a coil spring 123. Also shown is the conventional Perlick beer tap valve adjustment means 124 provided by a pin 125 rotatably by means of a knurled set screw 126. The double acting air cylinder is therefore directly linked to the Perlick tap lever 116. Since there is a possibility of leakage of beer from the valve 110 because of leakage of air from the cylinder 122 or by wear of the valve seat of the Perlick tap, the resilient connection by spring 123 normally urges the valve closed. This urging tends to prevent leakage of the beer valve.

Also provided in this valve control mechanism is a hand operated tap handle 128 linked by linkage rod 129 to a microswitch 130. The microswitch 130 is also associated with a hand operated toggle selector switch 131, since microswitch 30 is of a type which can actuate two separate and independent circuits when it is operated to its close position by the tap handle 128.

The tap handle linkage, the valve linkage, and the valve are all encased by a hood 132. The cooperations of the individual components shown in FIGURES 6 and 7 will be explained hereinafter when discussing the operation of the present invention.

The simplified interconnection of the elements constituting one feature of the present invention, is shown in FIGURE 6. The double acting air cylinder 122 is provided with two air inlets 133 and 134. Inlet 133 is connected via flexible line 135 to one outlet of a solenoid actuated four-way air valve 136, while inlet 134 is connected via flexible line 137 to another outlet of solenoid actuated air valve 136 (see FIG. 9). Valve 136 is that manufactured by Valvair Corporation, and is known as "Valvair Solenoids." However, other solenoid actuated four part air valves may be used.

Air under pressure which is permitted to flow through line 135 by valve 136 and to flow through line 137 by valve 136 is admitted through line 145 connected to a source of air under pressure (not shown). The use of a four part Valvair solenoid has the added advantage of fail safe operation. The parts are so connected that air pressure at all times passes through flexible line 137 tending to close the beer tap when the apparatus of the present invention is in its static deenergized condition. When the apparatus is energized, as by actuation of the handle 128, exhaust part to line 137 is opened, causing the double acting air cylinder to cause the valve to open. Thus, when the apparatus is at its "rest position," the air pressure (about 40 p.s.i.g.) tends to retain the beer valve closed.

Figure 8:
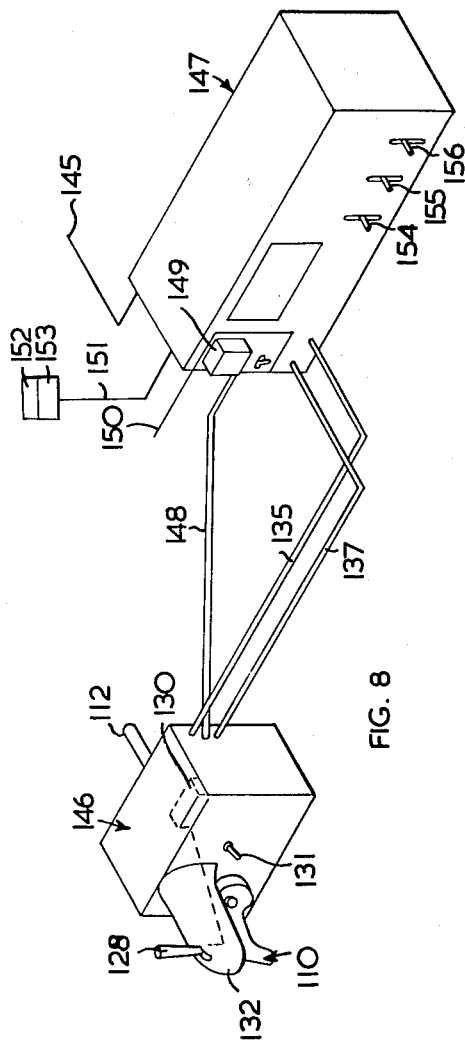
FIGURE 8 is a simplified and partly schematic perspective view of an apparatus according to the embodiment of FIGURE 6.

Turning now to FIG. 8, there is shown a diagrammatic representation of the present invention. The "switch box" 146, containing the elements shown in FIGURE 6 is electrically connected to a "control box" 147 (which will be described hereinafter) by means of control cable 148 to a master switch 149, and pneumatically by air lines 135 and 137. Master switch 149 is provided with power line 150 (which may suitably be 110 v. power supply). Leading from control box 147 is an electrical line 151 to a pair of counters 152 and 153. The control box 147 is provided with three adjustment levers 154, 155 and 156, whose function, respectively, is to control the length timed cycle of one timing, circuit (to be described hereinafter) to control the length of the timed cycle of and other timing circuit (to be described hereinafter) and to adjust the length of time of the "pause" in a pour-pause-pour sequence.

Figure 9:
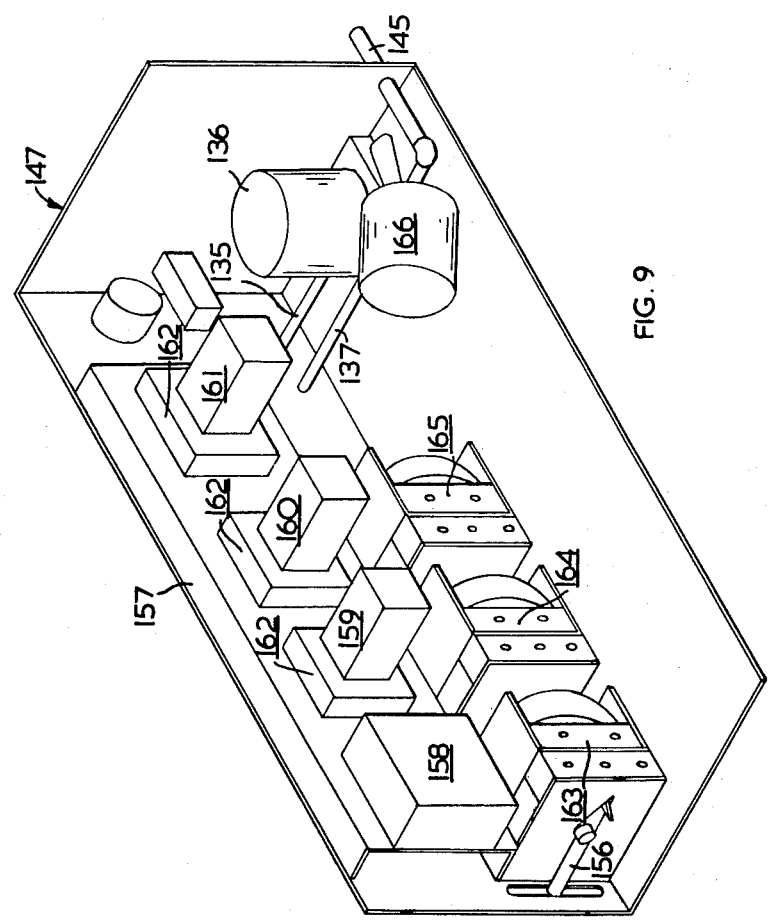
FIGURE 9 is a simplified and partly schematic perspective view of the timing circuits and associated apparatus used in the embodiment of FIGURE 6.

FIGURE 9 shows the physical constitution of components within the control box 147. Mounted on a base panel 157 are a 24 volt transformer 158, a third relay 159 provided with a 110 v. coil, a second relay 160 provided with a 24 v. coil and a first relay 161 also provided with a 24 v. coil. Relays 159, 160 and 161 may be those known as Potter and Brumfied (AMF) Relays, Serial No. KRP11AG, 145 v. 50/60 cycle, 10 amp noninductive. Other equivalent relays may, however, be used as the present invention does not reside in the selection of these particular relays. The relays are coupled to the base panel 157 by means of three Amphenol industrial-type 8 prong socket 162, although, of course, other sockets may be used.

Also mounted within control box 147 are timers 163, 164 and 165. Handle 156 is shown attached to timer 163 to adjust the length of "pause" between pours. Similarly, although not shown, handle 155 is attached to, and controls, timer 164, and handle 154 is attached to, and controls, timer 165. The timers used are those known as Industrial Timer Corporation Model SF, time 6 seconds, 115 v. 60 cycle, manufactured and sold by Sperry Gyroscope, and described in U.S. Patent No. 2,300,785, issued Nov. 3, 1942 to A. W. Haydon;
U.S. Patent No. 2,334,040, issued Nov. 9, 1943 to E. L. Schellens, and
U.S. Patent No. 2,353,305, issued July 11, 1944 to A. W. Haydon.

While the aforesaid timers have been used in practice, it is of course possible to use other, equivalent timing devices.

Also mounted on the control box 147 and attached to the air line 145 is an air silencer 166, whose function is to permit slow escape of excess air when the air valve closes, to prevent "knocking."

Figure 10:
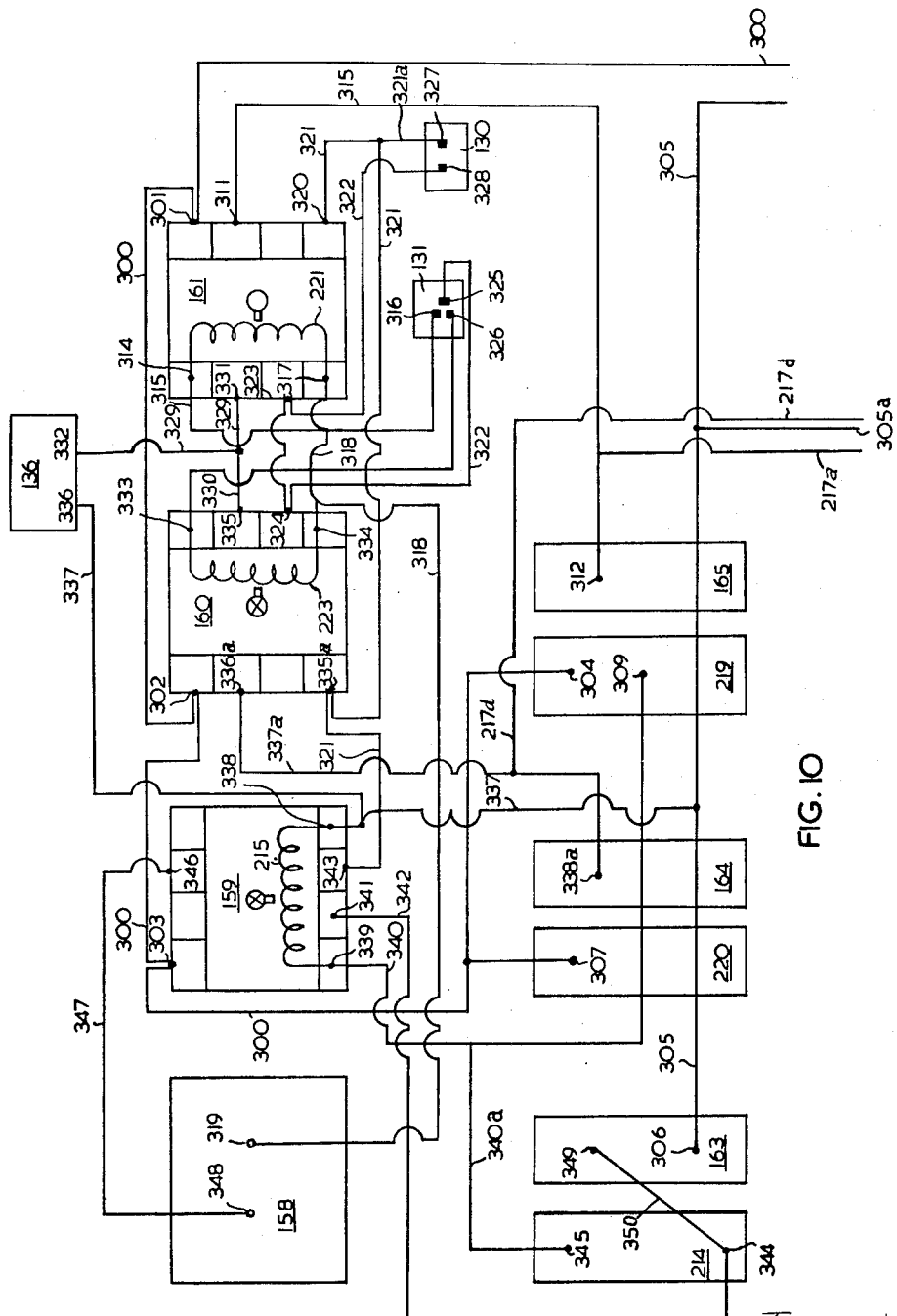
FIGURE 10 is a circuit diagram of the embodiment of FIGURE 6.

FIGURE 10 will now be described. One of the 110–115 v. lines 300 is connected to one terminal 301 of relay 161, to one terminal 302 of relay 160, to one terminal 303 and then to one terminal 304 of switch 219. The other 110–115 v. line 305 is connected to one terminal 306 of motor 163. A branch line 305a is connected from line 305 to the common terminal of the counters previously referred to. A line 313 leads from terminal 311 of relay 161 to terminal 312 of motor 165, and includes a branch line 217a forming an electrical connection to counter 222. Relay 161 is provided with a 24 v. transformer 221, one terminal of which (314) is connected via line 315 to one terminal 316 of selector switch 131, the other terminal of which (317) is connected via line 318 to one terminal 319 of transformer 158. Another terminal 320 of relay 161 is connected via line 321 and jumper line 321a to one terminal 327 of tap switch 130. The other terminal 328 of tap switch 130 is connected via line 322 to terminal 323 of relay 161, to terminal 324 of relay 160 and finally to common terminal 325 of selector switch 131. The final terminal 331 of relay 161 is connected via line 329 to terminal 332 of solenoid valve 136.

One terminal 333 of relay 160 is connected to 24 v. transformer 223; which, in turn, is connected via terminal 334 to line 318 previously described. Terminal 333 also connects transformer 223 to the final terminal 326 of selector switch 131. Terminal 335 connects solenoid 136 via line 329 (previously described) and line 330 to relay 160. Terminal 335a connected relay 160 to line 321 previously described, i.e., to terminal 327 of tap switch 130. Finally, terminal 336a connects, via line 337a, terminal 338a motor 164, and also includes jumper line 217d to counter 224.

Solenoid 136 is connected at terminal 336 via line 337 to terminal 338 of relay 159 and also to line 305. Terminal 338 connects transformer 215 to line 305 as well. The other end of transformer 215 is connected at terminal 339 via line 340 to terminal 309 of switch 219. Terminal 341 is connected, via line 342 to terminal 344 of switch 214 whose other terminal 345 is connected via line 340a to line 340 as previously described. Terminal 343 is connected via line 321 (as previously described) to terminal 327 of tap switch 130. Finally, terminal 346 is connected via line 347 to terminal 348 of transformer 158.

Terminal 344 of switch 214 is connected to terminal 349 of motor 163 by jumper line 350.

*Operation of the embodiment of FIGURES 6–10*

In operation, reference should be made to FIGURE 6. First, the toggle selector switch 131 is placed in one of two positions representative of a large draft or a small draft. The large draft representation is coupled to relay 161 and motor 165 while the small draft representation is coupled to the relay 160 and motor 164. For the sake of this description, a large draft will be dispensed, but it will be appreciated that a similar operation follows for dispensing a small draft.

Downward rotation of the tap handle 128 moves linkage rod 129 which actuates microswitch 130. This, in turn, energizes relay 161 with 24 v. A.C. Relay 161 switches 110 v. A.C. to time delay motor 165 and also 110 v. A.C. to energize the four part "Valvair" solenoid 136. Air, suitable at 30–40 p.s.i.g. is then permitted to flow to double acting air cylinder 122, the piston 120 in the cylinder moving forwardly to the push rod 117

(linked by coil spring 123 for more positive pressure movement) to push rod 116 to open "Perlick" tap 111, thereby permitting beer to flow out outlet 110.

When timer day motor 165 has reached its adjusted setting (i.e. timed stage of operation) it will switch 110 v. A.C. to the coil 215 of relay 159 to pause timer switch 214 to hold relay 159 "in" (i.e. operative) until pause timer motor 163 reaches its adjusted setting. As there are two switches in relay 159, as relay 159 comes in, the 24 v. A.C. circuit to relay 161 is broken. This switches relay 161 "off", which in turn breaks the circuit of 110 v. to "Valvair". This opens the "Valvair" solenoid to exhaust and opens air to the front line 137 of cylinder 122 which closes the "Perlick" tap, stopping the flow of beer. Because of the resilient linkage 123, beer valve 111 is biased closed.

When the pause timer motor 163 is running, even if switch 130 is closed, the circuit to the "Valvair" solenoid and to the relay 161 is open, and thus no beer may flow out beer tap 10. However, as soon as pause timer motor 163 reaches its adjust setting and stops running, and assuming the switch 130 is still closed, the relay 161 starts again, thus leaving the handle in the on position will continue to pour-pause-pour-pause, etc. as many times as required. The opening and closing of the beer tap between each pour assures a more uniform size and creates a nice head or foam per glass.

I claim:
1. Apparatus including a valve for dispensing liquid through an outlet, and valve controlling means, said valve controlling means comprising:
 (1) a handle;
 (2) a double acting cylinder including a piston therein, a shaft, inlet means to each side of said piston and outlet means from each side of said piston;
 (3) means associated with said handle to initiate movement of said piston; and
 (4) linkage operatively associated with said shaft to open and to close said valve to permit the controlled dispensing of said liquid.

2. Apparatus including a valve for dispensing liquid through an outlet, and valve controlling means, said valve controlling means comprising:
 (1) a handle;
 (2) a double acting cylinder including a pair of pistons interconnected by a rack, a pinion enmeshed on said rack, a shaft operatively connected to said pinion, and inlet and outlet means for fluid for each of said pistons;
 (3) means associated with said handle to initiate movement of said pistons; and
 (4) linkage operatively associated with said shaft to open and to close said valve to permit the controlled dispensing of said liquid.

3. Apparatus for the dispensing of a predetermined amount of liquid comprising:
 (1) a main valve communicating an outlet with a source of said liquid under pressure;
 (2) an operating handle;
 (3) switching means actuated by movement of said handle;
 (4) movable timing means initiated by actuation of said switching means;
 (5) valve means in a first air line operatively connected to said timing means and opened by the initiation of movement of said timing means;
 (6) a cylinder including a first piston and a linkage operatively associated therewith, said piston being operated by air in said first air line to cause said linkage to open said main valve to permit the flow of said liquid through said outlet;
 (7) valve means in a second air line operatively associated with said timing means and opened by the cessation of movement of said timing means; and
 (8) a second piston in said cylinder, said piston being operatively associated with said linkage and being operated by air in said second air line to cause said linkage to close said main valve to stop the flow of liquid through said outlet, the amount of liquid discharged through said outlet being thereby determined and controlled by the time of movement in said timing means.

4. The apparatus of claim 3 including an electrically actuated counter, actuated by said switching means, to total the number of drafts dispensed.

5. Means for controlled dispensing of draft beer subject to foam producing characteristics as it is dispensed, comprising: a faucet having an axial bore therethrough; a discharge spout at its lower end; a beer supply passage communicating with said bore; a valve seat in said bore; a cylinder having a piston therein and a piston rod projecting from one end thereof, said end of said cylinder forming a closure for the opposite end of said bore; a valve element on the end of said piston rod engageable with said valve seat; means urging said rod towards said valve seat to interrupt communication between said spout and said bore; means communicating with said cylinder for moving said piston whereby to disengage said valve element from said seat; a switch on said faucet; a circuit connected with said switch; means in said circuit controlling supply to said cylinder; and control means in said circuit initiated by momentary contact of said switch for maintaining said valve open over a time period required for filling said glass to a predetermined level whereby the user may retract the glass from said faucet to desired extent during said time period as to increase or decrease the amount of foam produced when said glass is filled.

6. Means for controlling dispensing of draft beer subject to foam producing characteristics as it is dispensed comprising: a dual operating faucet having an axial bore therethrough; a discharge spout at its lower end; a beer supply passage communicating with said bore; a valve seat in said bore adjacent said spout; a valve closing said seat; a cylinder having a piston therein and a piston rod projecting from one end thereof, said valve being carried on the end of said piston rod means urging said valve towards said valve seat; a manually swingable handle mounted on said faucet; supply means communicating with said cylinder, for moving said piston to disengage said valve from its seat; a switch on said faucet body above the lower end of said spout; a circuit connected with said switch; means in said circuit controlling supply to said cylinder; and control means in said circuit, initiated by momentary contact of said switch, for maintaining said valve open for a time period required for filling said glass to the predetermined level, whereby the user may retract the glass from said faucet to a desired extent, during said time period, as to increase or decrease the amount of foam produced when said glass is filled.

7. Means for controlled dispensing of draft beer subject to foam producing characteristics as it is dispensed, comprising: a faucet having an axial bore therethrough; a discharge spout at its lower end; a beer supply passage communicating with said bore; a valve seat in said bore; a cylinder having a piston therein and a piston rod projecting from one end thereof; a valve element on the end of said piston rod engageable with said valve seat; means urging said rod towards said valve seat to interrupt communication between said spout and said bore, supply means communicating with said cylinder for moving said piston whereby to disengage said valve element from said seat; a switch on said faucet; a circuit connected with said switch; means in said circuit controlling supply to said cylinder; and control means in said circuit initiated by momentary contact of said switch for maintaining said valve open over a time period required for filling said glass to a predetermined level whereby the user may retract the glass from said faucet to desired extent during said time period as to increase or decrease the amount of foam produced when the said glass is filled; including a manually operable switch in said circuit adapted to make one momentary contact when actuated.

8. A switch arrangement comprising: a valve; pivotally mounted means movable between a first position wherein said valve is open and a second position wherein said valve is closed; first linkage means secured at one end to said pivotally mounted means; a terminal end of a piston rod of a double acting fluid cylinder attached to the other end of said linkage means; lever means movable between a first position and a second position; and second linkage means connected to said lever means for initiating the flow of fluid to operate said cylinder whereby to open said valve.

9. A switch arrangement comprising: a valve; pivotally mounted means movable between a first position wherein said valve is open and a second position wherein said valve is closed; first linkage means secured at one end to said pivotally mounted means; a terminal end of a piston rod of a double acting fluid cylinder attached to the other end of said linkage means; pivotally mounted lever means movable between a first position and a second position; and second linkage means connected to said lever means for initiating the flow of fluid in one direction to operate said cylinder whereby to open said valve; and for initiating the flow of fluid in another direction whereby to close said valve.

10. A switch arrangement comprising: a valve; pivotally mounted means movable between a first position wherein said valve is open and a second position wherein said valve is closed; first linkage means secured at one end to said pivotally mounted means; a double acting air cylinder including a piston and air inlet means on either side of said piston; a piston rod attached to said piston and slidable therewith, said piston rod being provided with a plurality of teeth for acting as a rack; a pinion engaging said rack; a rod connected to said pinion and adapted to be rotated in complementary relation to movement of said pinion; a cam secured to the free end of said rod; a bifurcated arm pivotally secured to the end of said cam, said bifurcated arm being secured at its other end to the other end of said first linkage means, pivotally mounted lever means movable between a first position and a second position; second linkage means connected to said lever means for initiating the flow of air to one side of said piston to operate said cylinder whereby to open said valve and for initiating flow of air to the other side of said piston whereby to close said valve; and a cap over said valve, said lever means and said second linkage means.

11. A switch arrangement comprising: a valve; pivotally mounted means movable between a first position wherein said valve is open and a second position wherein said valve is closed; first linkage means secured at one end to said pivotally mounted means; a double acting air cylinder including a piston and air inlet means to either side of said piston; a piston rod connected to said piston and projecting out one end of said cylinder; a coil spring secured at one end to said piston rod and at the other end to said first linkage means whereby resiliently to connect said piston rod to said first linkage means; pivotally mounted lever means movable between a first position and a second position; second linkage means connected to said lever means for initiating the flow of air to one side of said piston to operate said cylinder whereby to open said valve, and for initiating flow of air to the other side of said piston whereby to close said valve; and a cap over said valve, said lever means and said second linkage means.

12. Means for controlled dispensing of a liquid comprising: a faucet including a discharge means, a valve operable between an opened and a closed position and a lever for operating said valve; a liquid supply conduit to a faucet; a double acting fluid cylinder including a piston and a piston rod projecting from one end thereof; linkage means connecting said lever and said piston rod; a second lever movable between a first position and a second position; a microswitch; a second link means connecting said second lever to said microswitch at least one timing circuit associated with said microswitch; means associated with said timing circuit for controlling supply of said fluid to said cylinder, said means being actuated by commencing of the timed cycle of said timing circuit to initiate fluid flow to said cylinder to move said piston rod in a first direction and actuated by the cessation of the timed cycle of said timing circuit for initiating fluid flow to said cylinder to move said piston rod in a second direction, whereby movement of said piston rod in said first direction opens said valve and movement in said second direction closes said valve.

13. Means for controlled dispensing of draft beer subjected to foam producing characteristics comprising: a faucet including a discharge means, a valve operable between an opened and a closed position and a lever for operating said valve; a liquid supply conduit to a faucet; a double acting fluid cylinder including a piston and a piston rod projecting from one end thereof; linkage means connecting said lever and said piston rod; a second lever movable between a first position and a second position; a microswitch; a second linkage means connecting said second lever to said microswitch; a selected one of at least two timing circuits associated with said microswitch; means associated with said timing circuit for controlling supply of said fluid to said cylinder, said means being actuated by commencing of the timed cycle of said timing circuit to initiate fluid flow to said cylinder to move said piston rod in a first direction and actuated by the cessation of the timed cycle of said timing circuit for initiating fluid flow to said cylinder to move said piston rod in a second direction, whereby movement of said piston rod in said first direction opens said valve and movement in said second direction closes said valve.

14. Means for controlled dispensing of draft beer subject to foam producing characteristics comprising: a faucet including a discharge means, a valve operable between an opened and a closed position and a lever for operating said valve; a liquid supply conduit to a faucet; a double acting air cylinder including a piston and a piston rod projecting from one end thereof; linkage means connecting said lever and said piston rod; a second lever movable between a first position and a second position; a microswitch actuated by the presence of said second lever in said second position; a second linkage means connecting said second lever to said microswitch; at least two timing circuits associated with said microswitch; one said circuit having a timed cycle adjustable between a first increment of a first selected time and a second increment of said first selected time; another said circuit having a timed cycle adjustable between a first increment of a second selected time and a second increment of said second selected time, said second selected time being substantially longer than said first selected time; manually actuable means for selecting one of said timing circuits to be operably connected to said microswitch; means associated with said selected timing circuit for controlling supply of said air to said cylinder, said means being actuated by commencing of the timed cycle of said timing circuit to initiate air flow to said cylinder to move said piston rod in a first direction and actuated by the cessation of the timed cycle of said timing circuit for initiating air flow to said cylinder to move said piston rod in a second direction, whereby movement of said piston rod in said first direction opens said valve and movement in said second direction closes said valve.

15. The means of claim 14 wherein said first selected time is about 1.5 seconds and said second selected time is about 2.5 seconds.

16. Means for controlled dispensing of draft beer subject to foam producing characteristics comprising: a faucet including a discharge means, a valve operable between an opened and a closed position and a lever for operating said valve; a liquid supply conduit to a faucet; a double acting air cylinder including a piston and a piston rod projecting from one end thereof; linkage means connecting said lever and said piston rod; a second lever movable between a first position and a second position; a microswitch actuated by the presence of said second lever in said second position; second linkage means connecting said second lever to said microswitch, three timing circuits associated with said microswitch; one said circuit having a timed cycle adjustable between a first increment of a first selected time and a second increment of said first selected time; another said circuit having a timed cycle adjustable between a first increment of a second selected time and a second increment of said second selected time, said second selected time being substantially longer than said first selected time; manually actuable means for selecting one of said timing circuits to be operably connected to said microswitch; said third timing circuit having a timed cycle adjustable between a third selected time and a fourth selected time for controlling the time interval between the cessation of the timed cycle of the selected timing circuit and the beginning of the next timed cycle of the selected timing circuit, said third timing circuit being actuated by continued presence of said second lever in said second position; means associated with said timing circuit for controlling supply of said air to said cylinder, said means being actuated by commencing of the timed cycle of said timing circuit to initiate air flow to said cylinder to move said piston rod in a first direction and actuated by the cessation of the timed cycle of said timing circuit for initiating air flow to said cylinder to move said piston rod in a second direction, whereby movement of said piston rod in said first direction opens said valve and movement in said second direction closes said valve.

17. The means of claim 16 wherein said first selected time is about 1.5 seconds, said second selected time is about 2.5 seconds, said third selected time is about 0.1 second and said fourth selected time is about 1 second.

18. Means for controlled dispensing of draft beer subject to foam producing characteristics comprising: a faucet including a discharge means, a valve operable between an opened and a closed position and a lever for operating said valve; a liquid supply conduit to a faucet; a double acting air cylinder including a piston and a piston rod projecting from one end thereof; linkage means connecting said lever and said piston rod, said linking means comprising a coiled spring directly but resiliently joining a free end of said lever to a free end of said piston rod; a second lever movable between a first position and a second position; a microswitch actuated by the presence of said second lever in said second position; a second linkage means connecting said second lever to said microswitch; at least two timing circuits associated with said microswitch; one said circuit having a timed cycle adjustable between a first increment of a first selected time and a second increment of said first selected time; another said circuit having a timed cycle adjustable between a first increment of a second selected time and a second increment of said second selected time, said second selected time being substantially longer than said first selected time; manually actuable means for selecting one of said timing circuits to be operably connected to said microswitch; means associated with said selected timing circuit for controlling supply of said air to said cylinder, said means being actuated by commencing of the timed cycle of said timing circuit to initiate air flow to said cylinder to move said piston rod in a first direction and actuated by the cessation of the timed cycle of said timing circuit for initiating air flow to said cylinder to move said piston rod in a second direction, whereby movement of said piston rod in said first direction opens said valve and movement in said second direction closes said valve.

19. Means for controlled dispensing of draft beer subject to foam producing characteristics comprising: a faucet including a discharge means, a valve operable between an opened and a closed position and a lever for operating said valve; a liquid supply conduit to a faucet; a double acting air cylinder including a piston and a piston rod projecting from one end thereof; linkage means connecting said lever and said piston rod, said linkage means comprising a coiled spring directly but resiliently joining a free end of said lever to a free end of said piston rod; a second lever movable between a first position and a second position; a microswitch actuated by the presence of said second lever in said second position; a second linkage means connecting said second lever to said microswitch, three timing circuits associated with said microswitch; one said circuit having a timed cycle adjustable between a first increment of a first selected time and a second increment of said first selected time; another said circuit having a timed cycle adjustable between a first increment of a second selected time and a second increment of said second selected time, said second selected time being substantially longer than said first selected time; manually actuatable means for selecting one of said timing circuits to be operably connected to said microswitch; said third timing circuit having a timed cycle adjustable between a third selected time and a fourth selected time for controlling the time interval between the cessation of the timed cycle of the selected timing circuit and the beginning of the next timed cycle of the selected timing circuit said third timing circuit being actuated by continued presence of said second lever in said second position; means associated with said timing circuit for controlling supply of said air to said cylinder, said means being actuated by commencing of the timed cycle of said timing circuit to initiate air flow to said cylinder to move said piston rod in a first direction and actuated by the cessation of the timed cycle of said timing circuit for initiating air flow to said cylinder to move said piston rod in a second direction, whereby movement of said piston rod in said first direction opens said valve and movement in said second direction closes said valve.

References Cited by the Examiner

UNITED STATES PATENTS

| | | | |
|---|---|---|---|
| 565,615 | 8/1896 | Grossman | 222—334 |
| 1,360,805 | 11/1920 | Sherman et al. | 222—504 |
| 2,721,702 | 10/1955 | Beverley. | |
| 3,081,913 | 3/1963 | Rotter | 222—504 X |
| 3,095,126 | 6/1963 | Willshaw | 222—504 X |
| 3,107,705 | 10/1963 | Isserstedt | 222—504 X |

LOUIS J. DEMBO, *Primary Examiner.*

CHARLES R. CARTER, *Examiner.*